(No Model.)

A. DOLL.
EGG AND FLOUR MIXER.

No. 270,642. Patented Jan. 16, 1883.

WITNESSES:
Jno. N. Rosenbaum.
Otto Risch

INVENTOR
Arnold Doll
BY Paul Goepel
ATTORNEY

UNITED STATES PATENT OFFICE.

ARNOLD DOLL, OF CLEVELAND, OHIO.

EGG AND FLOUR MIXER.

SPECIFICATION forming part of Letters Patent No. 270,642, dated January 16, 1883.

Application filed November 4, 1882. (No model.)

*To all whom it may concern:*

Be it known that I, ARNOLD DOLL, of Cleveland, in the county of Cuyahoga and State of Ohio, have invented certain new and useful Improvements in Egg and Flour Mixers, of which the following is a specification.

This invention has reference to an improved mixing-machine for family and business purposes, which may be used for beating eggs and mixing them with sugar, butter, or flour, or for making ice-cream, and for similar purposes; and the invention consists of a covered trough that is hung by trunnions into a larger open box, and provided with a longitudinal shaft having spirally-arranged radial beaters. The beater-arms are perforated, and provided at their outer ends with wings or scrapers at right angles thereto. The shaft is revolved by a suitable gearing from the outside, and the trough oscillated simultaneously therewith by a forked detachable frame, which is pivoted to the outer box and a fixed pin of the trough, and actuated by an eccentric cam on the driving-shaft.

Figure 1:
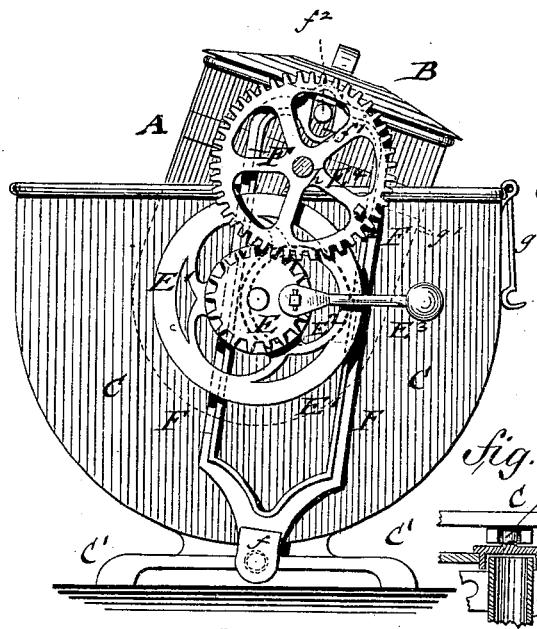
Figure 2:
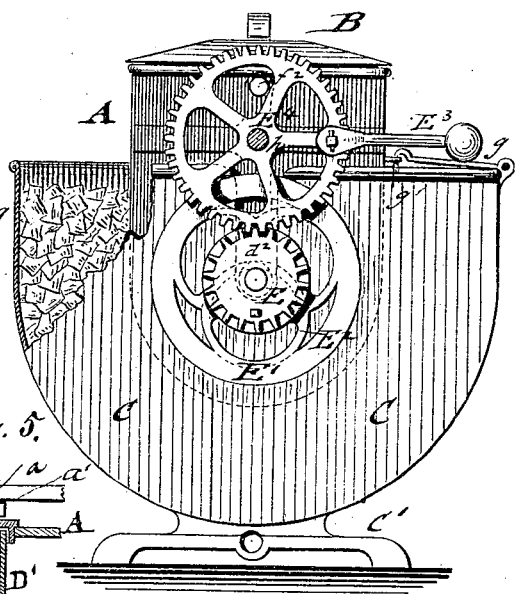
Figure 3:
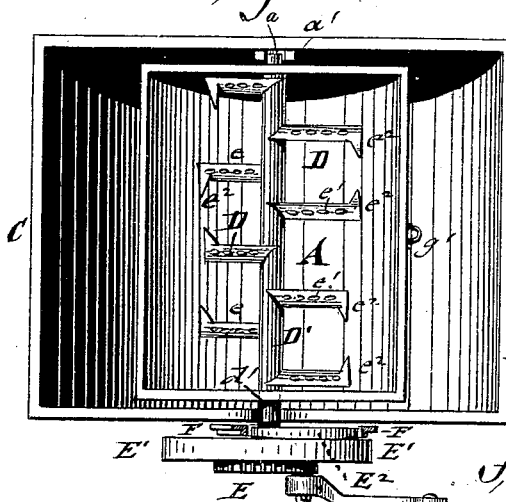
Figure 4:
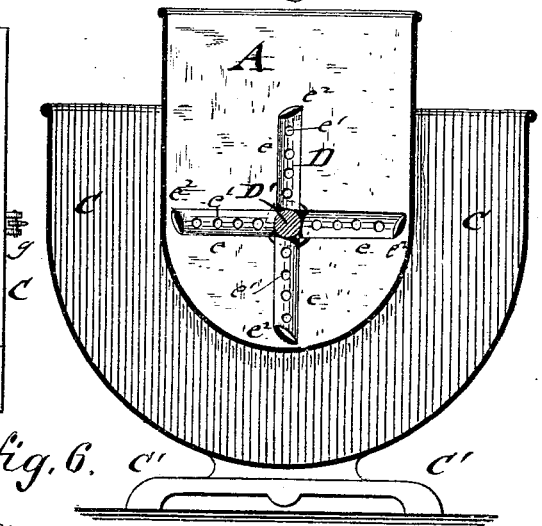
Figure 6:
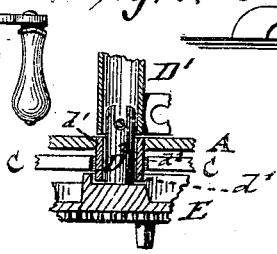

In the accompanying drawings, Figures 1 and 2 represent side elevations of my improved mixing-machine, shown respectively with and without the forked oscillating frame. Fig. 3 is a top view; Fig. 4, a vertical transverse section of the same; and Figs. 5 and 6 are detail horizontal sections, showing the connection of the trough and box.

Similar letters of reference indicate corresponding parts.

A in the drawings represents a trough with a semicircular bottom and a tightly-closing cover, B. The trough A is hung to bearings of an open box, C, by an exterior trunnion, $a$, at one of its end walls, and by the hollow center shaft, $D'$, of the agitator D to the short detachable shaft $D^2$ of the main driving-wheel E, said shaft being coupled by an end recess to a fixed transverse pin of the agitator-shaft D, as shown clearly in Fig. 6. The box C is of larger size than the trough A, and has, like the trough, a bottom part of semicircular shape, and is supported on a suitable base-frame, $C'$. The agitator D is arranged at the interior of the trough A, its shaft $D'$ being supported at one end to an interior socket-bearing, $a'$, of the end wall of trough C, as shown in Fig. 5, while its opposite end is coupled to the short shaft $D^2$ of the main driving-wheel E. The short shaft $D^2$ passes through a fixed hollow sleeve, $d'$, of the end wall of trough A, adjoining the driving-wheel E. The fixed sleeve $d'$ passes through a slotted recess, $d^2$, of box C, which also serves as a guide-bearing for the short shaft $D^2$. The shaft $D'$ of the agitator is arranged with radial beater-arms $e$, which are arranged spirally around the shaft. The beater-arms have a lens-shaped cross-section, so as to cut easier through the substances to be mixed. They are provided in the body thereof with perforations $e'$, and at the outer ends with wings or scrapers $e^2$, that extend at right angles to the beater-arms and parallel to the center shaft, $D'$, as shown clearly in Fig. 1, so as to return the mass adhering to the surface of the trough into the path of the beaters. A balance-wheel, $E'$, is cast in one piece with the driving gear-wheel E, and provided at its back with an eccentric flange, $E^2$, which engages a forked oscillating frame, F, that is connected by a pivot-pin, $f$, in a detachable manner to the base-frame $C'$, and by a slot, $f'$, to a fixed pivot-pin, $f^2$, at the upper end of the trough A.

A detachable crank-handle, $E^3$, is applied to the driving-wheel E, and serves to turn the same, so as to impart simultaneously a revolving motion to the agitator D and by means of the flange $E^2$ and forked frame F an oscillating motion to the trough A, as shown in Figs. 1 and 3.

By filling the outer box with hot water, eggs, sugar, butter, flour, and other substances can be successfully mixed in the machine, which is also an effective ice-cream freezer when the exterior box is filled with small lumps of ice and salt, as shown in Fig. 2. The beater-arms work up the mass at the interior of the trough, while the scrapers remove such parts thereof as will be liable to stick to the surface of the trough, as butter or sugar, or eggs mixed with sugar, or flour, or similar substances. By removing the driving-wheel E the agitator D can be readily removed from the trough and all the parts cleaned with great facility.

The mixing-machine may also be used without oscillating the trough A by detaching the forked frame F. The trough A is then retained in fixed vertical position by means of a hook, $g$, that is hinged to the box C and applied to an eye, $g'$, of the trough A, as shown in Fig. 2. The exterior box, C, is then either filled with hot or cold water, or with broken ice, as required by the articles to be mixed. The hand-crank $E^3$ is then applied to a gear-wheel, $E^4$, that turns on a short projecting shaft, $h$, of the end wall of the trough A, and that meshes with the driving-wheel E. By the interposition of the gear-wheel $E^4$ a more rapid motion is imparted to the agitator D, while the trough A remains stationary.

The mixing-machine may by this arrangement serve for a variety of purposes, the smaller sizes being thereby specially adapted for domestic use, while the larger sizes are suitable for confectioners, restaurants, and other business purposes.

Having thus described my invention, I claim as new and desire to secure by Letters Patent—

1. In a mixing-machine, the combination of an exterior box, an interior trough supported in suitable bearings of the box, a detachable agitator supported in bearings of the trough, a forked frame pivoted to the base-frame and trough, and mechanism whereby simultaneously revolving motion is imparted to the agitator and oscillating motion to the trough, substantially as and for the purpose set forth.

2. In a mixing-machine, the combination of an exterior box, an interior trough supported in bearings of the box, a detachable agitator supported in bearings of the trough, a driving-wheel coupled to the shaft of the agitator, and a forked oscillating frame, pivoted to the base-frame and the trough and actuated by an eccentric flange or cam of the driving-wheel, substantially as set forth.

3. The combination, in a mixing-machine, of an exterior box, a trough supported in bearings of the box, an interior agitator having radial arms, means for locking the trough rigidly in position, and mechanism whereby a revolving motion is imparted to the agitator, substantially as specified.

4. In a mixing-machine, an agitator having radial perforated beater-arms, and scrapers extending at right angles from the outer ends of the arms, substantially as specified.

In testimony that I claim the foregoing as my invention I have signed my name in presence of two subscribing witnesses.

ARNOLD DOLL.

Witnesses:
PAUL GOEPEL,
SIDNEY MANN.